Jan. 16, 1940. W. E. STITZ Re. 21,328
ENGINE MOUNTING
Original Filed Jan. 7, 1936 3 Sheets-Sheet 1
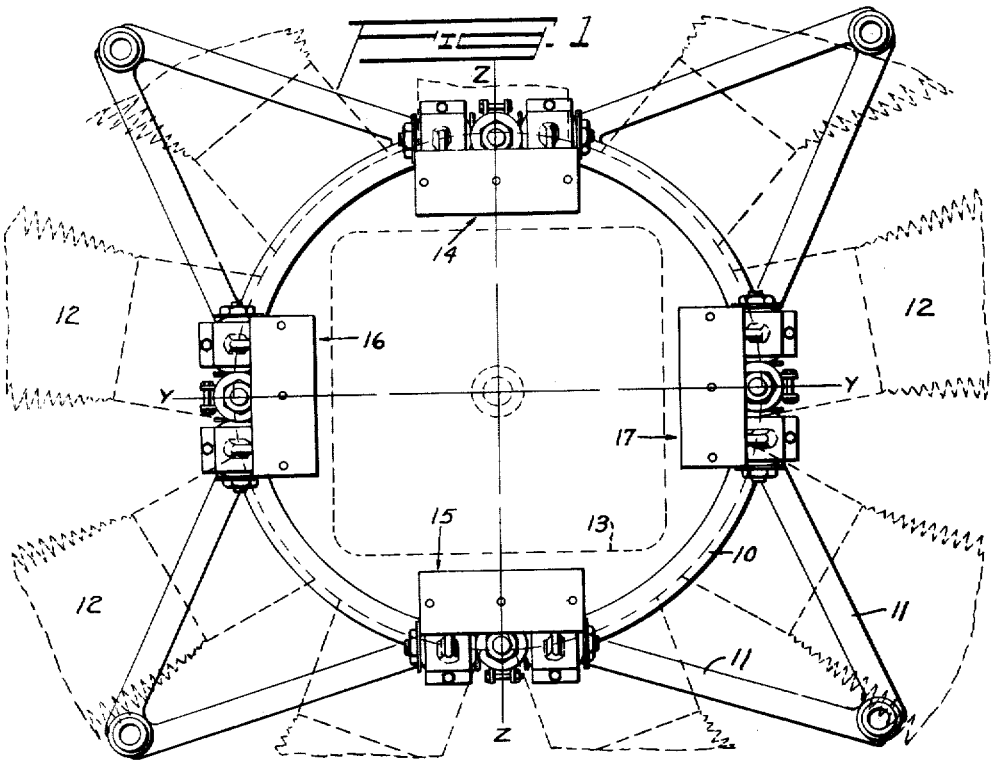
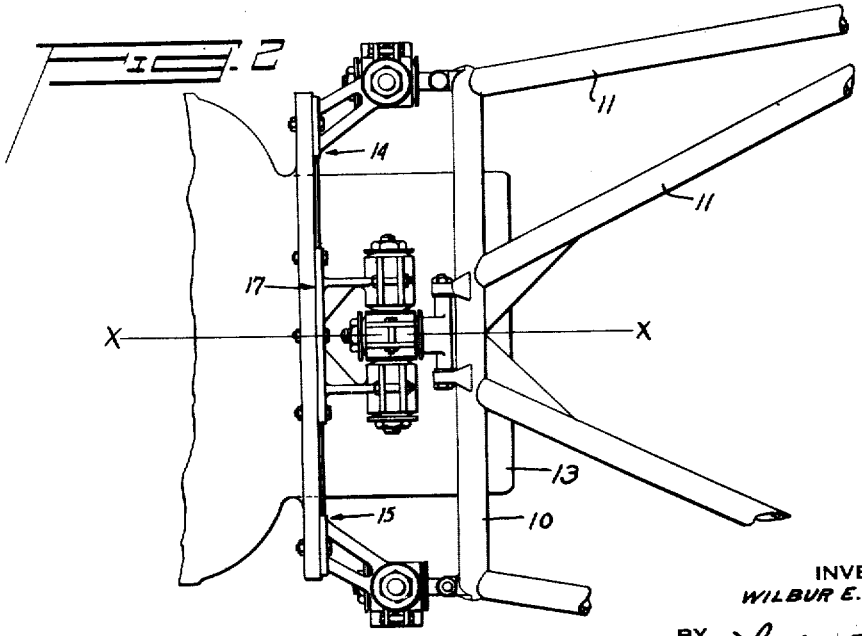
INVENTOR
WILBUR E. STITZ,
BY Wade Koontz
ATTORNEY

ENGINE MOUNTING

Original Filed Jan. 7, 1936 3 Sheets-Sheet 2

INVENTOR
WILBUR E. STITZ,
BY Wade Koontz
ATTORNEY

Jan. 16, 1940. W. E. STITZ Re. 21,328

ENGINE MOUNTING

Original Filed Jan. 7, 1936 3 Sheets-Sheet 3

INVENTOR
WILBUR E. STITZ,
BY Wade Tomty
ATTORNEY

Reissued Jan. 16, 1940 Re. 21,328

UNITED STATES PATENT OFFICE 21,328

ENGINE MOUNTING

Wilbur E. Stitz, Dayton, Ohio, assignor to Lord Manufacturing Company, Erie, Pa., a partnership comprising H. C. Lord and Blanche M. Hartman Original No. 2,145,280, dated January 31, 1939, Serial No. 57,933, January 7, 1936. Application for reissue October 21, 1939, Serial No. 300,663

38 Claims. (Cl. 248—5)

(Original patent granted under the act of March 3, 1883, as amended April 30, 1928; 370 O. G. 757)

The original Patent No. 2,145,280, issued to Stitz January 31, 1939, in accordance with the act of March 3, 1883, as amended April 30, 1928, with the following proviso in the specification: "The invention described herein may be manufactured and used by the Government for governmental purposes without the payment to me of any royalty thereon." The rights then and thereby vested in, and made available to, the Government of the United States have not been or are not hereby curtained, rescinded or expanded by this reissue of the original patent.

The present invention relates generally to internal combustion engines and is more specifically directed to means for mounting engines or other bodies in their supporting frames or bases in such a manner as to substantially completely prevent the transmission of vibrations incident to the operation of the engines or bodies to their supporting frames or bases.

It contemplates particularly a mounting means for attaching an engine to an airplane in such a manner as to reduce the destructive wear produced upon the fuselage by vibration of the engine.

Engines having crankshafts rotated by reciprocating pistons in common use in motor vehicles are subject to bodily vibrations of relatively small amplitude but relatively great intensity due to causes inherent in their operation. The trend toward higher compression ratios, increased horsepower outputs, and more rigid airplane structures has increased the seriousness of engine vibrations, making its elimination more urgent not only from the standpoint of preventing its transmission to other major parts of the aircraft, but also from the standpoint of relieving the occupants of the aircraft from the disagreeable sensations incident to continuous and excessive vibrations.

At the present time, there are two principal methods which may be suggested in combating the destructive effects of vibrating forces originating in bodies having rotating and reciprocating parts; first, the forcing impulses producing periodic vibrations may be eliminated by studies of improved engine design and balancing; second, the excitation may be isolated by means of an improved elastic suspension system for the body. Inasmuch as the present invention is primarily concerned with the second method, the principal factors that must be considered will be discussed hereinafter in greater detail.

Theoretically, all steady state vibration phenomena result from the frequency matching of forcing impulses and natural modes of free vibration. Therefore, a solution of the problem, if one exists, must begin with a study of the nature, value, and frequency of the forcing impulses or exciting forces and natural frequencies. Of all the prime movers, the airplane engine and the propeller are probably the greatest sources of vibrating forces. These vibrating forces may be divided into two classes, namely:

(a) The alternating forces generated by the rotating and reciprocating parts of the engine, including the propeller; and (b) The fluctuating and alternating forces generated by the gas explosion pressures.

Practical experience with the excitation of natural frequencies incident to engine operation show the existence of forcing impulses having frequencies related to engine R. P. M. The rotating and reciprocating parts of the engine generate vibrations having orders of one and two times crankshaft speed. By counterweights, it is possible to balance first order impulses resulting from the crankshaft and connecting rod motion. However, the second order impulses of the connecting rod motion can not be balanced out in the case of a single crank radial engine. In two crank radials, the second order of forces form a couple which can not be balanced out. The gas explosion pressures of the engine generate periodic impulses which are multiples of the firing cycle, the lowest harmonic having been found to have a frequency which is one half the crank shaft R. P. M.

Another source of vibration forcing impulses to be considered in connection with engine mountings is the propeller. In general, there are three types of exciting forces which are generated by a propeller. These are:

1. Rotating forces generated by mechanical unbalance;
2. Impulses of aerodynamic origin; and
3. Impulses of gyroscopic origin.

The first type of unbalance generates two types of forcing impulses. The first and most common type of excitation results from unequal blade weights and is usually referred to as static unbalance. The second type of unbalance arises by reason of the fact that the center of gravity of each blade may not be in the plane of rotation of the propeller blades. This excitation is in the form of a couple rotating with the thrust axis. These mechanical unbalanced frequencies have the value of propeller R. P. M.

The principal aerodynamic sources of forcing vibrations are due to unequal blade pitch settings and blade flutter. Vibrations in the thrust of each blade produces a couple rotating at propeller speed and acting about an axis at right angles to the axis of rotation. This type of excitation becomes exceedingly important in controllable pitch propellers inasmuch as large forcing couples may be set up by improper working of the control mechanism. Blade flutter is a possible source of excitation. A type of blade flutter may occur as the result of an obstruction such as a wing or landing gear located too near the propeller, and an impulse generated each time that a blade passes this obstruction.

The third type, or gyroscopic vibrations or forcing impulses, are generated in two blade propellers because the moments of inertia are not equal about the two normal axes at right angles to the axis of rotation. These unequal moments of inertia generate two complete vibrations per propeller revolution when the thrust axis experiences a rotating motion such as occurs when the airplane is turning or diving or when the engine and mount vibrates about the $z$ (vertical) or $y$ (horizontal) axis. In three- and four-blade propellers, the phase angle between these gyroscopic vibrations is such that the alternating forces add up to a constant force.

Experience has taught that in the case of a 400 H. P. 9-cylinder radial engine of conventional design, the value of the gas explosion torque forcing impulses vary from three percent of the mean torque for the 1½ order to thirty per cent for the 4½ order. The first and second orders are also found to be as high as from fifteen to twenty-five per cent of the mean torque. In the case of a geared engine, that is, where the engine is geared to the propeller, these forces are all increased by a value equal to the gear ratio. The values of these torque harmonics vary in different types of engines and also are known to vary in different engines of the same type. Of the mechanical unbalanced frequencies, the second harmonic of the connecting rod motion is known to be as high as 1500 pounds at 2000 R. P. M. in some engines. The value of the other harmonics of crankshaft and propeller will generally vary with manufacturing precision.

Every body having mass and elasticity exhibits a tendency to vibrate freely when displaced from its rest position. When a body is released from the deflected position, there occurs an interchange of kinetic energy of the mass and the potential energy of the elastic part of the body.

The number of such interchanges of energy per unit of time is usually referred to as the natural frequency of the system. This natural frequency depends upon the mass and elasticity of the system and is in no way related to external exciting forces or impulses. However, when the frequency of a forcing impulse is exactly in step with the frequency of the free vibration, that is, the natural frequency of body, the amplitude of the vibrating motion that the body experiences may become very large.

The elasticity of a body may be measured in different directions; for example, a built-in contilever beam may exhibit several elastic properties, one in bending, one in torsion, and possibly one in tension and compression. Each of these different elastic properties of the body, together with its mass, may result in an easily excited natural frequency. The number of such free, independent vibrations, having their own natural frequencies, specifies the degree of freedom of a body. Theoretically, a body has as many degrees of freedom as the number of independent space coordinates required to specify its elasticity of motion.

The major parts of an airplane's structure have several degrees of freedom, each having its own characteristic frequency. For example, the wing may vibrate in bending with one or two loops, and in torsion, or individual parts of the wing may have their own frequency such as the ribs, spars, and sections of the covering. There is almost an infinite number of free vibration frequencies throughout the airplane structure. Due to these many natural frequencies which can be excited by forcing impulses generated in an engine, the aircraft vibration problem becomes very serious.

The present invention is particularly concerned with the provision of a novel, flexible mounting which isolates vibration, that is to say, one which will substantially completely prevent transmission of forcing impulses from the engine to the airplane structure, and is particularly desirable in correcting the vibrative problems incident to airplane engines which are mounted in the usual manner in overhanging relation to their supports, as illustrated in the drawings. Vibration isolation is not to be confused with vibration absorption. Vibration absorption requires the use of friction, such as fluid friction, as is obtained with an oil dash pot and rubbing friction as is obtained by friction brakes. Vibration isolation is obtained by flexible mountings and the flexibility of a mount is determined by its natural free vibration frequencies. The equation for the transmissibility of a flexible mounting is usually given in the following formula:

$$E=\frac{1}{\left(\frac{W_f}{W_n}\right)^2-1}$$

in which E=transmissibility, usually expressed as a ratio of the deflection produced by forcing impulses acting as a static load, to the deflection produced by the forcing impulse acting as an alternating load or vibrating force.

$W_f$=frequency of the forcing impulses of a constant value; and $W_n$=the natural free vibration frequency.

This equation disregards the phase angle between the force and motion, as it is of no interest in mounting. From the above equation it can be seen that when the vibration is neither increased, nor decreased, that is when $E=1$, the natural frequency $$W^\circ=\frac{1}{\sqrt{2}}\times\text{the disturbing frequency } W_f$$

and that to accomplish vibration isolation the natural frequency must be less than $$\frac{1}{\sqrt{2}}\times\text{the disturbing frequency.}$$

The theory of vibration isolation is usually presented as a simple system of one degree of freedom. In an actual mounting, however, such a simple system does not exactly exist and the mounting may vibrate at a number of different natural frequencies. As a general rule an engine and mounting structure has six natural frequencies. These six natural frequencies are composed of three vibrating motions of translation, one in line with the $x$, the $y$, and the $z$ axis, and three motions of rotation about these three axes. This means, then, that a flexible mounting is a system with six degrees of freedom with each degree of freedom having its own characteristic resonant frequency. It is by virtue of these six resonant frequencies that vibration may be transmitted, isolated or amplified. For any mounting to actually prevent the transmission of vibration, these resonant frequencies must be lower than the frequencies of the exciting or forcing impulses occurring at cruising and maximum engine R. P. M. The prior art teaches of mountings that have been designed having one low natural frequency in the direction of a single exciting force, the other five natural frequencies being located outside the operating range of the forcing impulse frequency. However, the directions of forcing impulses in a 9-cylinder radial engine are such that to accomplish efficient isolation of the vibration, the six resonant frequencies must be located within the idling range of the engine.

In an actual design it is necessary to obtain an arrangement of associated parts having rigidities in three directions so that the resulting six natural frequencies will have values very closely related. In most elastic mountings, the highest natural frequency is usually found as being ten times the lowest, the others following somewhere within this range. This means that if the lowest frequency occurs around six hundred C. P. M. the highest will be six thousand C. P. M., thus giving a band of natural frequencies having a range approximately as wide as the range of the excitation. It is also found that the six natural frequencies are more or less interrelated and one alone can not be changed without changing the other five.

An aim, therefore, of the present invention is to provide some arrangement of flexibility in which the six natural frequencies can be concentrated in a band of about 300 or 400 cycles wide, which band could then be located somewhere in the band of exciting force frequencies so as to give the best possible vibration isolation and mounting rigidity under existing flight loads. It is essential, however, in every type of flexible mounting that the natural frequencies be lowered by decreasing the rigidity of the mount. Obviously, such an arrangement requires the use of elements having yieldable characteristics, such, for example, as springs or other elements having like yieldable characteristics. For this use rubber has been found to offer a satisfactory material of sufficient yielding characteristic when used under a shear load. It has been found that rubber springs can be made to conform to definite spring rates and in such sizes as to occupy a minimum of mounting space. Specifically, one form of elements having yieldable characteristics, as above set forth comprise bushings which consist of an inner and an outer sleeve of steel between which is vulcanized rubber of a composition to give the specified spring rates. In this bushing, the rubber is vulcanized directly to the steel bushings and it is found that the bond to the steel is stronger than the rubber itself. By suitably mounting the rubber bushings, they can be made to support the thrust of the engine with the rubber in shear which is quite yielding as compared to resistance in a radial direction on the bushings.

The primary object, therefore, of the present invention is to provide a novel means and method of mounting an engine in an aircraft structure in a manner such that the vibrations inherent in said engine will be isolated in the mounting to thereby prevent the transmission of forcing impulses from the engine to the airplane structure.

Another object of the present invention is to provide a flexible mount for an aircraft, the natural frequencies of vibration of which are lower than the frequency of the forcing impulses.

A still further object of the present invention is to provide an engine mount having six degrees of freedom with the six natural frequencies located in a range very close together and within the idling range of the engine.

A still further object of the present invention is to provide in a mount having six degrees of freedom an arrangement of means operating in a manner such that each degree of freedom of the mount has its own characteristic frequency with the individual frequencies lower than the frequencies of the exciting or forcing impulses occurring at cruising or maximum engine speed.

A still further object of the present invention is to provide simple and economical means whereby the associated parts will be positively maintained in their assembled relation by the interposition of elements of connection which will function to isolate or sustain the vibrations which may be initiated or built-up in any part and thereby effectively prevent the transmission thereof to other parts or to the airplane structure.

A still further object of the present invention is to provide a novel arrangement of cushioning devices between the engine and the fuselage structure upon which it is mounted to the complete elimination of any metallic contact between these members and still retain the requisite rigidity and stability in the assembly.

A still further object of the present invention is to provide a novel arrangement of cushioning devices between the engine and the fuselag structure upon which it is mounted which operate in a manner such that the torque reactions or piston unbalance or both may vibrate the engine bodily within the normal amplitude of the vibrations caused by these inherent forcing impulses, through the normal position of the mass, thus isolating them from the supporting frame or structure, said cushioning devices being so constructed and arranged with respect to one another and with respect to the supporting structure such as to limit the vibratory movements to the plane or planes in which these forces act.

A still further object of the present invention is to provide a novel arrangement of mounting devices between the engine and the fuselage structure upon which it is mounted, said mounting devices being pivotally secured to the engine supporting structure for movement about predetermined pivotal axes and including rubber bushings so positioned with respect to the pivotal axes of said devices that predetermined vibratory movements of said engine are yieldably sustained by an axial shear stress of the rubber in predetermined rubber bushings.

With the foregoing and other objects in view the invention consists in the combination of parts and in the details of construction hereinafter set forth in the following specification and appended claims, certain embodiments thereof being illustrated in the accompanying drawings in which:

Fig. 1 is a front elevation of the motor and mounting arrangement in the present preferred embodiment of my invention;

Fig. 2 is a side elevation of Fig. 1 with a portion of the airplane fuselage carrying the engine supporting ring;

Referring more particularly to the drawings wherein corresponding parts are designated by like numerals throughout the several views thereof, the improved mounting arrangement in the present preferred embodiment of my invention comprises generally a four-point, symmetrical arrangement of mounting bushings which will give the necessary flexibility in the $x$, $y$, and $z$ directions for low natural frequencies. In this mounting arrangement there are twelve bushings, eight of which are used to isolate torque impulses and carry the torque reactions, four bushings resisting thrust loads, and the bushing groups are hinged with respect to one another and with the engine support in a manner such that only four torque bushings take the vertical engine loads and the other four torque bushings the horizontal loads.

By observing Fig. 1 it will be noted that each bushing group consists of three bushings which resist loads in two directions only and become inactive or go out of action for a small travel in a third direction. This arrangement also provides two distinct springs in each direction, a soft or very resilient one for vibration isolation which is very sensitive as to this, resulting in placing the rubber in shear, and a stiff one for resisting shock and flight loads.

Referring more particularly to Fig. 1, 10 designates the engine supporting ring. This ring is of common construction and supported by struts 11 extending from the airplane frame.

Figure 4:
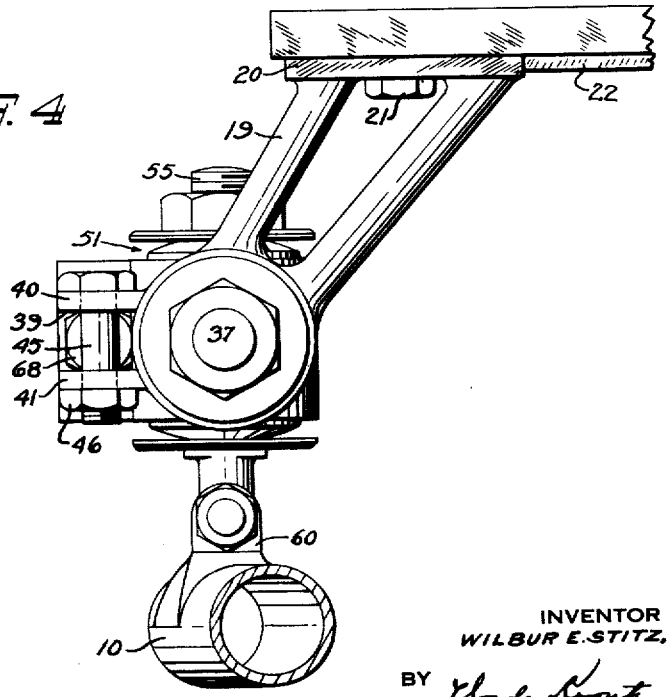
Fig. 4 is a side elevation of Fig. 3.
Figure 5:
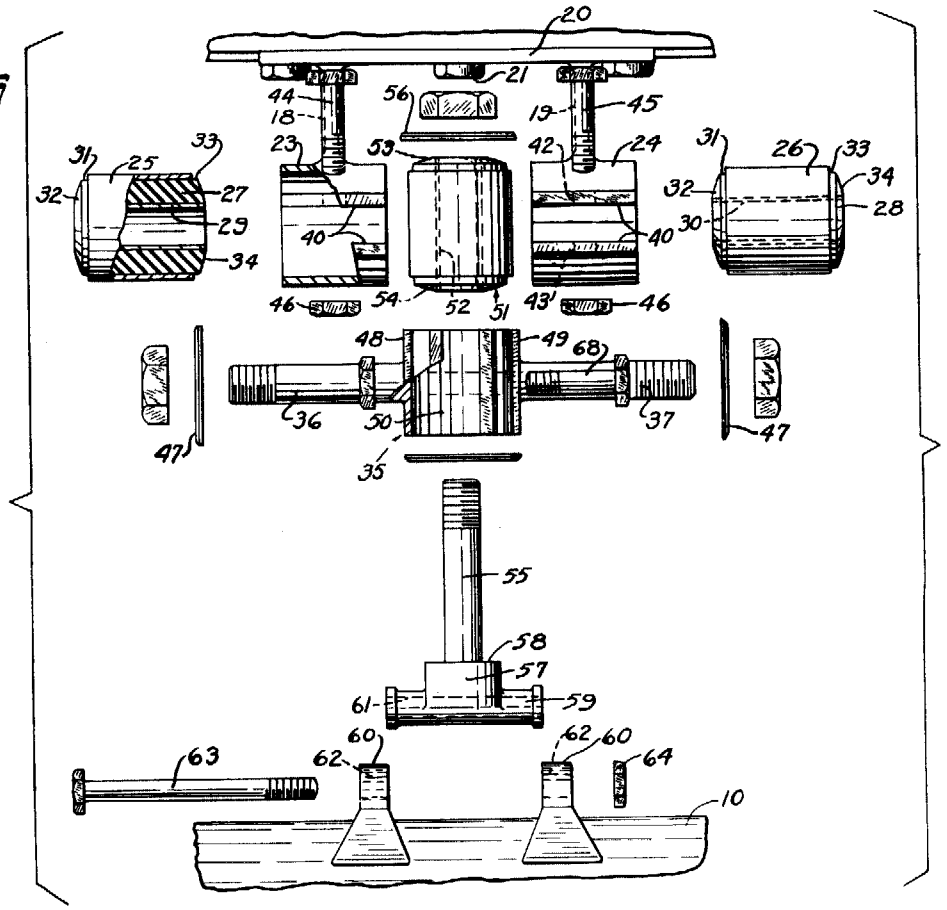
Fig. 5 is an exploded view of the various parts comprising the complete mounting unit.

The engine has cylinders 12 radially arranged and carried by a frame or crank case 13 which corresponds in general outline and opposes the supporting ring 10. As indicated in the drawings, the engine is arranged in overhanging relation to the supporting ring and it will be understood that in ordinary airplane practice the propeller is in overhanging relation to the engine, and that the center of gravity is in front of and overhangs from the supporting ring. A plurality of mounting units are secured to the engine frame. These units, as shown more particularly in Fig. 4, are symmetrically arranged about the longitudinal or $x$ axis of the engine. Preferably, I provide four mounting units, each unit comprising swinging cushioned links including the bolt 55 extending laterally from the supporting ring, that is, in position to provide a substantially radial movement for the free ends of the links as the links are swung, and while I have shown the links as perpendicular to the support at the mean position the lateral extension of the links is not confined to this direction. Each mounting assembly including the links comprises a mounting bracket, two of which, identified by the numerals 14 and 15, are arranged diametrically opposite with respect to the longitudinal axis $x$—$x$ of the engine and supporting ring. These brackets are also arranged to bisect a vertical plane passed through the longitudinal axis of the engine. The two brackets for the remaining units, particularly identified by the numerals 16 and 17, are diametrically oppositely disposed about the longitudinal axis $x$—$x$ of the engine and arranged to bisect a horizontal plane passed through the longitudinal axis of the engine. Inasmuch as these brackets are identical in construction, the following detailed description of one should suffice for all. Each bracket is provided with ears 18 and 19, respectively, carried by a common connecting plate 20. Machine screws 21 are screwed into the frame and passed through the plate 20. The frame is provided with overhanging shoulders 22 which maintain each bracket against turning movement on the frame.

Each mounting bracket is provided with a pair of spaced sleeves 23 and 24 adapted for receiving rubber bushing shells 25 and 26, respectively. The sleeves of the bushings in each unit are arranged tangent to arcs centering on the longitudinal axis of the supporting ring. Each bushing shell 25 and 26 has walls of rubber or rubber bushings 27 and 28 which extend from each shell to inner sleeves or hollow pins 29 and 30. The rubber of the bushing is preferably bonded to the outer shells and hollow pins and is under initial radial tension. This may be accomplished by vulcanizing the rubber in place and placing the rubber under tension as the rubber shrinks as it cools in vulcanization. The rubber is given a certain amount of stability but has, under these circumstances, such freedom for incipient motion as to be very effective in absorbing periodic vibrations. Thus, also, the normal load is held by the rubber under tension and may be made as yielding or as soft as may be desired, that is to say, the rubber may be increased in length, increasing the rate of increase of resistance to movement or it may be made shorter, thus reducing the rate of increase of resistance and the same effects may be accomplished by increasing the diameter of the shell and the radial dimensions of the rubber wall.

The rubber of the shells extends as at 31 slightly beyond the ends of the shells 25 and 26 and terminate in a tapered face 32. At the opposite end of the shells the rubber extends as at 33 slightly beyond the shell ends and is provided with a similar tapered face 34. It is to be understood that these tapered faces are formed with relation to the shape assumed by the rubber under normal load and it is so shown in Fig. 4.

Figure 3:
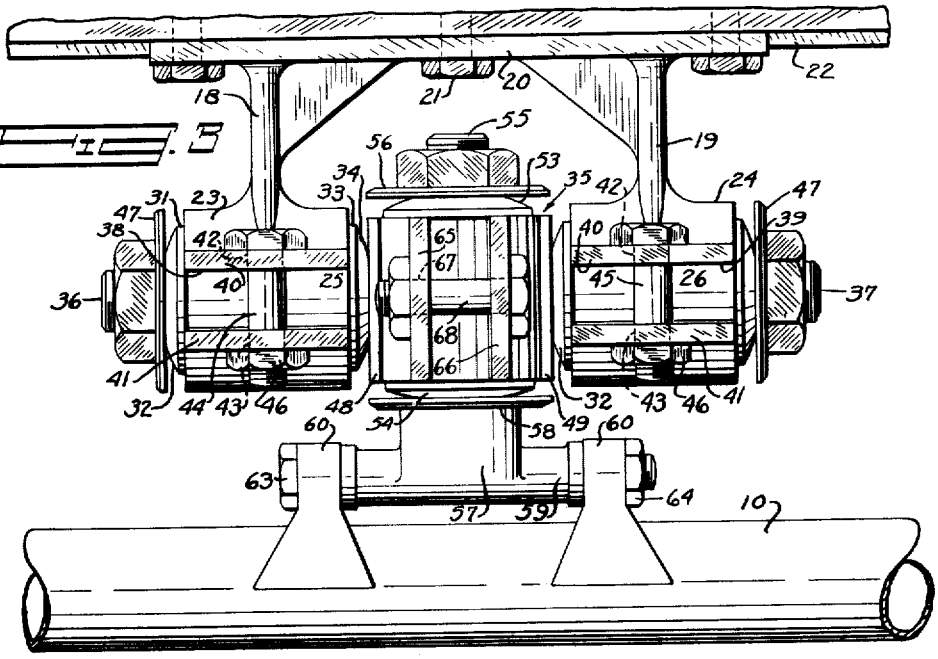
Fig. 3 is an enlarged detail plan view of one mounting unit.

The space between the sleeves 23 and 24 is occupied by a trunnion or intermediary member 35 having a pair of co-axial bolts 36 and 37, respectively, which extend through the hollow pins 29 and 30. As shown more particularly in Figs. 2 and 3, the sleeves 23 and 24 are slotted as shown at 38 and 39 and provided with spaced clamping portions 40 and 41. The space between the clamping portions is made sufficiently wide to permit the passage of the bolts 36 and 37 during assembly. Each clamping portion is provided with openings 42 and 43 in registry with one another which are adapted to receive studs 44 and 45 having nuts 46 screwed on their ends whereby to rigidly clamp the shells 25 and 26 in their respective sleeve portions after assembly. The bolts 36 and 37, respectively, are provided with washers 47 which rest against the outer ends of the pins 29 and 30.

It will be observed that the free movement, as it may be termed, prior to the setting of the surfaces 32 and 34 may be made anything desired by varying the contour of the said surfaces.

Furthermore, the abruptness or rate of increase of resistance may be varied by increasing or decreasing the extensions 31 and 33. If these extensions are increased, the rate of increase in resistance becomes less because the strain is less localized on the rubber in the shell. Again, the relation may be varied by changing the diameter of the shell. With a large diameter and a greater span of rubber carrying the load, the rate of increase of resistance is reduced, but with the same extension there is a greater quantity of rubber which is subjected to the localized strain and consequently the rate of increase at the face 32 or 34 bottoms is made greater and also is of greater capacity for receiving violent shocks.

The inner ends of the pins 29 rest against shoulders 48 and 49 formed on the trunnion 35. These shoulders, together with the washers 47, act as stops to limit the axial movement of the bushings against abnormal thrust. The bolts 36 and 37 are threaded at their outer ends to receive nuts thereon to maintain the washers 37 in position against the outer ends of the hollow pins 29 and 30.

The trunnion or intermediary member 35 is provided centrally with a split sleeve 50, the axis of which is arranged parallel to the longitudinal axis $x$—$x$ of the supporting ring 10. Furthermore, the axis of the trunnion sleeves in the mounting units 14 and 15 are coincident with the vertical plane represented by the line $z$—$z$, while the trunnion sleeves for the mounting units 16 and 17 are coincident with the horizontal plane represented by the line $y$—$y$.

Each trunnion sleeve is adapted to receive a rubber bushing shell 51 of the type set forth hereinabove in connection with the bracket sleeves 23 and 24. Specifically, the bushing shell 51 in the trunnion sleeve 50 has a wall of rubber which extends from the shell to an inner hollow pin 52. The rubber of the shell 51 extends beyond the outer end of the shell and terminates in a tapered face 53. At the opposite or inner end of the shell 51, the rubber extends beyond the shell and is provided with a similarly shaped tapered face 54. A bolt 55 extends through the hollow shell 51. This bolt is provided with a washer 56 which rests against the outer end of the hollow pin 52. The bolt 55 comprises a part of and is formed integral with a knuckle 57. This knuckle is provided with a shoulder 58 against which the inner end of the hollow pin 52 rests. The washer 56 and shoulder of the knuckle 57 act as stops to limit the axial movement of the rubber bushing against abnormal thrusts. The knuckle 57 is provided at its opposite end with a bearing portion 59 which registers at its opposite ends with lugs 60 provided on the supporting ring 10. These lugs and the bearing portion of the knuckle 57 are provided with openings 61 and 62, respectively, through which are adapted to extend a bolt 63 having a nut 64 threaded on its outer end.

Obviously, this arrangement results in a hinging action of the knuckle 57 about the bearing portion 59. As shown more particularly in Fig. 1, the hinging axes of the mounting units 14 and 15 are not only disposed in parallel relation with respect to one another, but are further disposed at right angles to the vertical plane represented by the line $z$—$z$, while the hinging axes of the mounting units 16 and 17 are similarly arranged in parallel relation with respect to one another and at right angles to the hinging axes of the brackets 14 and 15 and also at right angles to the horizontal plane represented by the line $y$—$y$.

It is to be further noted that the sleeve portion of the trunnion is of split construction, each half portion being formed with clamping lugs 65 and 66 having registering openings 67 through which are extended locked bolts 68 to permit locking of the trunnion bushing therebetween after assembly.

In the foregoing description I have described the mounting brackets as being separate from the engine crankcase. Obviously, these brackets could be formed as an integral part of the crankcase without departing from the spirit of the invention.

From the foregoing it is seen that the invention provides low restraint about the torque axis of the power plant by means of the axial shearing action in the tangentially placed rubber bushings 27 and 28 so that a natural frequency less than $$\frac{1}{\sqrt{2}} \times \text{the normal primary operating frequency}$$

is obtained and effective isolation provided.

It is also apparent that a natural frequency for rotative movement other than about the torque axis, such for instance as is permitted by an angular degree of freedom, through the combined action of the additional groups of elements incorporated in the system, namely, the group of fore and aft rubber bushings included between the shells 51 and 52 which provide low restraint fore and aft by axial shear movement of the rubber and the group composed of the links which pivot on bolts 63 and allow motion radially with respect to the torque axis restrained only by the axial shear in the tangentially placed rubber bushings 27 and 28 which are at right angles to the links which at the moment are swinging together with whatever slight cocking action there may be of the axially placed links. Thus a combination of the movements of the links and bushings permits any point on the power plant to move with small restraint in a spherical path about any point the system may choose as an oscillating center, in other words, introduces into the system an angular degree of freedom of the body about an axis parallel to the supporting structure with a natural frequency in the corresponding modes of vibration less than $$\frac{1}{\sqrt{2}} \times \text{the normal primary vibrating frequency of the vibrating body.}$$

In this way also, more effective isolation is attained.

Furthermore, by the action of the link group as described in relation to which translational motion is restrained only by axial shear in the tangentially placed rubber bushings which are at right angles to the links which at the moment are swinging, a substantially translational motion in a direction radial to the torque axis is permitted with a sufficiently low resistance to secure a natural frequency less than $$\frac{1}{\sqrt{2}} \times \text{the normal primary operating frequency of the power plant.}$$

In this way also more effective isolation is effected.

It will be apparent that I have provided a mounting arrangement in which the isolation of vibration is accomplished in a simple and efficient manner without impairing the strength of the structural units or the structure as a whole.

While the invention has been described in considerable detail, it is to be clearly understood that the foregoing description is for the purpose of illustration only and that the right is reserved to make such additional changes in the details of construction and arrangement of parts as will fall within the purview of the appended claims.

What I claim as new is:

1. The combination with a body subject to vibrations and its support, of means interposed between said body and the support for interconnecting the same, said means comprising a multiple series of rubber bushings, the individual bushings of the one series being arranged with their axes tangent to a common arc and the longitudinal axes of the individual bushings of the other series being arranged normal to the plane formed by said common arc and at right angles to the axes of the bushings of said first-mentioned series.

2. The combination with a body subject to vibrations and its support, of means interposed between said body and the support for interconnecting the same, said means comprising a multiple series of rubber bushings, the individual bushings of the one series being arranged with their axes tangent to a common arc and the individual bushings of the other series being arranged perpendicular to the plane formed by said common arc and at right angles to the axes of the bushings of said first-mentioned series, and extensions on said bushings limiting the axial movement against abnormal forcing impulses.

3. In an engine mounting, the combination of a ring support, an engine frame opposing the support, means interposed between the ring support and engine comprising a plurality of circularly disposed mounting units, each of which includes mounting means attached to the ring support, and mounting means attached to the engine, one of said mounting means including a pair of aligned metallic sleeves, rubber bushings mounted in the sleeves, a trunnion common to the rubber bushings and pivotally mounted therein, said trunnion being pivotally attached to the other mounting means on an axis normal to the longitudinal axis of the trunnion so as to permit swinging movement about the longitudinal axis of the trunnion and about the pivotal axis normal thereto.

4. The combination of means mounting a member having rotating parts subjecting the member to induced periodic vibrations of different characteristics, an annular supporting member for the vibrating member, said members having sets of attaching units arranged in oppositely disposed pairs about said annular member and pivotally secured to said members for paired hinging movement, the pivotal axes of one pair being arranged at right angles to the pivotal axes of the other pair and groups of rubber bushings disposed between and bonded to the attaching units of both members, the individual bushings in each group being so positioned with respect to each other and with the pivotal axes of said units that predetermined vibratory movements in said vibrating member are yieldably sustained by an axial shear stress of the rubber in predetermined bushings of each group.

5. The combination of means mounting a member having rotating parts subjecting the member to induced periodic vibrations of different characteristics, an annular supporting member for the vibrating member, said means having four sets of attaching units arranged in oppositely disposed pairs about said annular member and pivotally secured to said members, the pivotal axes of the one pair being arranged at right angles to the pivotal axes of the other pair to permit simultaneous hinging action of the paired sets of units, and groups of rubber bushings disposed between and bonded to the complemental parts of said attaching units, the individual bushings in each group being so positioned with respect to each other and with the pivotal axes of their attaching units that predetermined vibratory movements in said vibrating member as yieldably sustained in predetermined bushings of each group with the rubber in shear stress in an axial direction.

6. The combination of means mounting a member having rotating parts subjecting the member to induced periodic vibrations of different characteristics, an annular supporting member for the vibrating member, said members having four sets of attaching units arranged in oppositely disposed pairs about said annular member and pivotally secured to said members, the pivotal axes of the one pair being disposed in a horizontal plane, the pivotal axes of the other pair being disposed in a vertical plane and at right angles to the plane of the pivotal axes of said first-mentioned pair to permit simultaneous hinging action of the paired sets of units only, and groups of rubber bushings disposed between and bonded to the complemental parts of said attaching units, the individual bushings in each group being so positioned with respect to each other and with the pivotal axes of their respective attaching units that predetermined vibratory movements in said vibrating member are yieldably sustained in predetermined bushings of each group with the rubber in shear stress in an axial direction.

7. The combination of means mounting a member having rotating parts subjecting the member to induced periodic vibrations of different characteristics, an annular supporting member for the vibrating member, said members having four sets of attaching units arranged in oppositely disposed pairs about said annular member and pivotally secured to said members, the pivotal axes of the one pair being disposed in a horizontal plane, the pivotal axes of the other pair being disposed in a vertical plane and at right angles to the plane of the pivotal axes of said first-mentioned pair to permit simultaneous hinging action of the paired sets of units only and groups of rubber bushings disposed between and bonded to the complemental parts of said attaching units, the individual bushings in each group comprising three in number, the axes of two of which are in parallel alignment with respect to one another and in the plane of the hinging axes of their respective attaching units, the axis of the third being arranged at right angles to the axes of said first-mentioned bushings and lying within said plane.

8. The combination of means mounting a member having rotating parts subjecting the member to induced periodic vibrations of different characteristics, a supporting member for the vibrating member, said members having attaching units including complemental parts pivotally secured to one another and to one of said members for hinging movement about predetermined pivotal axes, and groups of rubber bushings interposed between and bonded to the complemental parts of said attaching units, the individual bushings of each group being so positioned with respect to one another and with the pivotal axes of said units that predetermined vibratory movements in said vibrating member are yieldably sustained by an axial shear stress of the rubber in predetermined bushings of each group.

9. A vibration absorbing device for mounting a parasitically vibratory body upon a support, said device including a triaxial mounting means for pivotally mounting the body upon said support, two of said axes being disposed at right angles to each other and the third axis being normal to the plane formed by said two axes, each of said axes permitting oscillatory movement thereabout, and means for substantially isolating from the support the oscillations of the body swinging about any of said axes.

10. A vibration absorbing device for mounting a parasitically vibratory body upon a support, said body having both oscillatory and rectilinear movements, said device including triaxial mounting means for pivotally mounting the body upon said support, said means including two axes angularly disposed to each other and the third axis being angularly disposed with respect to a plane common to said two axes, vibration isolating means for substantially isolating the swinging movements of the body about any of said axes, and additional isolating means for substantially isolating rectilinear movements of the body along any of said axes.

11. A device for mounting a body having rotating parts subjecting the body to induce parasitic vibrations of different characteristics, said device including sets of supporting units arranged in quadrature, each of said units including pivots disposed at right angles to each other, one of which is normal to the plane formed by the axis of the other and a pivot of the adjacent unit, and rubber bushings surrounding the bearing of each pivot, the bushings of one set yielding in shear upon movement of a pivot of one of the other sets to thereby substantially isolate the vibrations transmitted from the vibratory body.

12. A vibration absorbing mechanism for mounting a parasitically vibratory body upon a support, said body having both oscillatory and rectilinear movements, said mechanism including mounting units, each mounting unit including a pair of parallel rubber bushings having their longitudinal axes extending in parallel relation and another rubber bushing having its longitudinal axis extending in a general direction normal to the general direction of said parallel longitudinal axes, said bushings providing for free movement of the body in at least one direction, and isolating other movements of the body from the support.

13. A mounting mechanism for interconnecting a support to an engine or the like generating parasitic vibrations, said mounting mechanism including a plurality of circularly disposed mounting units including mounting means attached to the engine, second mounting means attached to the support, at least one of said mounting means having a pair of diverging arm-like portions, a pivotally mounted member having its opposite ends mounted upon a pair of parallel pivots one of which is interconnected to the mounting means of the engine and the other interconnected to the mounting means on the support, at least one of said ends including at the pivot joint a rubber bushing adapted to yield both axially and radially in response to engine vibrations, the pivots of one unit being angularly disposed with respect to the corresponding pivots in an adjacent unit.

14. A mounting mechanism for interconnecting a support to an engine or the like having parasitic vibrations, said mounting mechanism including a plurality of circularly disposed units each of which includes mounting means, pivotally mounted interlocking means, a rubber bushing assembly for pivotally attaching the interconnecting means to the mounting means, said rubber bushing assembly including a metallic sleeve attached to one of said means, a metallic core attached to the other of said means and a tubular rubber member disposed intermediate said sleeve and said core to provide an engine bushing yielding both radially and axially, a second mounting means forming a pivotal mounting for said interconnecting means, one of said mounting means being connected to the engine and the other mounting means connected to the support, whereby the engine is resiliently interconnected to the support through the interconnecting means having a free swinging movement in one direction, the longitudinal axes of the pivots in one unit forming angles with respect to the corresponding pivots in an adjacent unit.

15. A mounting mechanism for mounting an engine upon a support, said mounting mechanism including a plurality of circularly disposed connecting units each of which includes movably mounted connecting means, means for interconnecting said movably mounted means to the support, said interconnecting means providing for movement of said movably mounted means in one direction in one plane, and means for connecting said movably mounted means to the engine, said engine interconnecting means providing for movement of said movably mounted means also in one direction, each unit including resilient means permitting yielding movement of said interconnecting means in at least two directions normal to the direction of the first-mentioned movement so as to yieldably support the engine upon the support, the planes of the first-mentioned movements of adjacent units being angularly disposed to each other.

16. In a mounting system, the combination of a vibrating body adapted for overhung suspension on an upright support; and a suspension attached to the body for supporting the body in overhung relation to such a support, providing angular degrees of freedom of the vibrating body about axes in an upright plane facing such a support, for reducing the vibrational effects thereof, comprising an elastic means incorporated in the suspension, the suspension supporting the body through the elastic means having an elastic yieldability under load in the directions of movement corresponding to the movement of the body at the suspension about said axes, with natural frequencies in said directions less than $\frac{1}{\sqrt{2}} \times$ the normal primary vibrating frequency of the vibrating body.

17. In a mounting system, the combination of a vibrating body adapted for overhung suspension on an upright support, said body comprising a rotating part; and a suspension attached to the body for supporting the body in overhung relation to such a support, providing angular degrees of freedom of the vibrating body about axes in an upright plane facing such a support, and torsional freedom about the axis of the rotative part for reducing the vibrational effects thereof, comprising an elastic means of elastic material such as rubber incorporated in the suspension, the elastic material in the means providing an elastic yieldability under load in the directions of movement corresponding to the movements of the body at the suspension about said axes, with natural frequencies in said directions substantially equal and less than the normal primary vibrating frequency of the vibrating body.

18. In a mounting system, the combination of a vibrating body adapted for overhung suspension on an upright support; and a suspension attached to the body for supporting the body in overhung relation to such a support, providing angular degrees of freedom of the vibrating body about axes on a substantially upright plane facing such a support, for reducing the vibrational effects thereof, comprising an elastic cushioned means incorporated in the suspension, with an elastic yieldability under load in the directions of movement corresponding to the said angular movements of the body at the suspension, the elastic cushioning incorporated in the suspension being of elastic material such as rubber providing through shear of the elastic material, the major portion of the elastic resistance to said angular movements.

19. In a mounting system for an overhanging aeroplane power plant, the combination of an engine adapted for overhung suspension from an upright supporting structure of a plane, said engine having a rotating take-off element having its axis at an angle to the supporting structure; and a suspension for supporting the engine in overhung relation to such a support, providing angular degrees of freedom of the engine about axes in a plane substantially perpendicular to the axis of the engine for reducing the vibrational effects thereof, comprising an elastic means incorporated in the suspension, the suspension supporting the body through the elastic means having an elastic yieldability under load in the direction of movement corresponding to the movements of the engine at the suspension about said axes, with natural frequencies in said directions less than $\frac{1}{\sqrt{2}} \times$ the normal primary vibrating frequency of the engine mass.

20. In a mounting system, the combination of a vibrating body having a rotating part adapted for overhung suspension on an upright support; and a suspension attached to the body for supporting the body in overhung relation to such a support providing angular degree of freedom of the vibrating body about axes in an upright plane facing such a support, and a degree of torsional freedom for rotatively induced impulses, for reducing the vibrational effects thereof, comprising an elastic means incorporated in the suspension, the suspension supporting the body through the elastic means having an elastic yieldability under load in the directions of movement corresponding to the movements of the body at the suspension about said axes and about the axis of the rotating part, with natural frequencies in said directions less than $\frac{1}{\sqrt{2}} \times$ the normal primary vibrating frequency of the vibrating body.

21. In a mounting system, the combination of a vibrating body having a rotating part adapted for overhung suspension on an upright support; and a suspension attached to the body for supporting the body in overhung relation to such a support providing angular degrees of freedom of the vibrating body about axes in an upright plane facing such a support, a degree of torsional freedom for rotatively induced impulses and a degree of freedom substantially translational to the axis of the rotating part comprising an elastic means incorporated in the suspension, the suspension supporting the body through the elastic means having elastic yieldability under load in the directions of movement corresponding to the movements of the body at the suspension angularly, torsionally and translationally, with natural frequencies in said directions less than $\frac{1}{\sqrt{2}} \times$ the normal primary frequency of the vibrating body.

22. In a mounting system, the combination of an overhanging aeroplane power plant, the combination of an engine adapted for overhung suspension on an upright support of an aeroplane structure; and a suspension attached to the engine for supporting the engine in overhanging relation to such a support providing angular degrees of freedom of the engine about axes in a plane substantially perpendicular to the axis of the engine, and degrees of torsional freedom for rotatively induced impulses of the engine, for reducing the vibrational effects thereof, comprising an elastic cushioned means incorporated in the suspension, with an elastic yieldability under load in the directions of movement corresponding to the angular and torsional movements of the engine at the suspension, the cushioning incorporated in the suspension being of elastic material such as rubber providing through shear of the elastic material the major portion of the elastic resistance to said angular and torsional movements.

23. In a mounting system, the combination of a vibrating body adapted for overhung suspension on an upright support; and a suspension attached to the body for supporting the body in overhung relation to such a support providing angular degrees of freedom of the vibrating body about axes in an upright plane facing such a support, for reducing the vibrational effects thereof, comprising a plurality of vertically and horizontally spaced units in a plane substantially parallel to said upright plane, having elastic means incorporated in the units, the units supporting the body through the elastic means having an elastic yieldability under load in the directions of movement corresponding to the movements of the body at the suspension about said axes, with natural frequencies in said directions less than $\frac{1}{\sqrt{2}} \times$ the normal primary vibrating frequency of the vibrating body.

24. In an elastic mounting for an overhanging engine, groups of elastic supports supporting the engine, said groups providing independently selectable characteristics for each group whereby one group provides substantial freedom in response to the torsional thrusts of the engine and the other group provides substantial angular freedom to provide for the pitch and yaw of the engine.

25. In a suspension system for bodies subject to vibrations, the combination of an upright support; a body subjected to vibrations supported in lateral off-set relation to the supporting structure; and connecting means between the structure and the body comprising a series of horizontally and vertically spaced cushioned links swinging on axes some of which at least are in angular relation to others, extending laterally from the body, said links supporting and cushioning the body.

26. In a suspension system for bodies subject to vibrations, the combination of an upright support; a body subjected to rotatively induced vibrations and supported in lateral off-set relation to the supporting structure; and connecting means between the structure and the body comprising a series of swinging cushioned links arranged around the axis of rotative disturbance and extending laterally from the structure, said links supporting and cushioning the body.

27. In a mounting system, the combination of a vibrating body adapted for overhung suspension on an upright support; and a suspension attached to the body for supporting the body in overhung relation to such a support providing angular degrees of freedom of the vibrating body about axes in an upright plane facing such a support for reducing the vibrational effects thereof, comprising a series of horizontally and vertically spaced cushioned links extending from the body and swinging on axes, some of which, at least, are in angular relation to the axes of others, said links supporting the body in overhung relation from such a support, said suspension having an elastic yieldability under load in the directions of movement corresponding to the movement of the body at the suspension about said axes.

28. In a mounting system, the combination of a vibrating body adapted for overhung suspension on an upright support; and a suspension attached to the body for supporting the body in overhung relation to such a support providing angular degrees of freedom of the vibrating body about axes in an upright plane facing such a support for reducing the vibrational effects thereof, comprising a series of horizontally and vertically spaced cushioned links extending from the body and swinging on axes, some of which, at least, are in angular relation to the axes of others, said links supporting the body in overhung relation from such a support, said suspension having an elastic yieldability under load in the directions of movement corresponding to the movement of the body at the suspension about said axes, with natural frequencies in said directions less than $\frac{1}{\sqrt{2}}\times$ the normal primary vibrating frequency of the vibrating body.

29. In a mounting system for an overhanging airplane power plant, the combination of an engine adapted for overhung suspension on an upright support on the airplane; and an elastic suspension attached to the engine for supporting the engine in overhung relation to such support providing angular degrees of freedom of the engine about axes in a plane substantially at right angles to the engine axis for reducing the vibrational effects thereof, comprising a series of swinging links distributed around the axis of the engine and extending from the engine for suspending the engine in overhung relation from such a support, and said suspension comprising an elastic means incorporated therein having yieldability under load in the directions of movement corresponding to the angular movements of the engine.

30. In a mounting system for an overhanging aeroplane power plant, the combination of an engine adapted for overhung suspension on an upright support on the aeroplane; and an elastic suspension attached to the engine for supporting the engine in overhung relation to such support providing angular degrees of freedom of the engine about axes in a plane substantially at right angles to the engine axis for reducing the vibrational effects thereof, comprising a series of swinging links distributed around the axis of the engine and extending from the engine for suspending the engine in overhung relation from such a support, and said suspension comprising an elastic means incorporated therein having yieldability under load in the directions of movement corresponding to the angular movements of the engine at the suspension with natural frequencies in said directions less than $\frac{1}{\sqrt{2}}\times$ the normal primary frequencies of the engine.

31. In a mounting system, the combination of a vibrating body comprising a rotating part adapted for overhung suspension on an upright support; and elastic suspension attached to the body for supporting the body in overhung relation to such support providing angular degrees of freedom of the vibrating body about axes in a substantially upright plane facing such a support and torsional freedom in response to the rotative impulses of the rotating part for reducing the vibrational effects thereof comprising a series of swinging links extending from the body and around the axis of the rotating part, said links supporting the body, and said elastic suspension comprising an elastic means incorporated therein having yieldability under load in the directions of movement corresponding to the angular and torsional movements of the body at the suspension.

32. In a mounting system, the combination of a vibrating body comprising a rotating part adapted for overhung suspension on an upright support; and elastic suspension attached to the body for supporting the body in overhung relation to such support providing angular degrees of freedom of the vibrating body in a substantially upright plane facing such a support and torsional freedom in response to the rotative impulses of the rotating part for reducing the vibrational effects thereof comprising a series of swinging links extending from the body and around the axis of the rotating part, said links supporting the body, and said elastic suspension comprising an elastic means incorporated therein having yieldability under load in the directions of movement corresponding to the angular and torsional movements of the body at the suspension with natural frequencies in said directions less than $\frac{1}{\sqrt{2}}\times$ the normal primary vibrating frequency of the vibrating body.

33. In a mounting system, the combination of a vibrating body comprising a rotating part adapted for overhung suspension on an upright support; and an elastic suspension attached to the body for supporting the body in overhung relation to such a support providing angular degrees of freedom of the vibrating body about axes in a substantially upright plane facing such a support, torsional freedom in response to the rotative impulses of the rotating part and freedom translational to said axis, for reducing the vibrational effects thereof comprising a series of swinging links extending from the body around the axis of the rotating part, said links supporting the body and said elastic suspension comprising an elastic means incorporated therein having an elastic yieldability under load in the directions of movement corresponding to the angular, torsional and translational movements of the body at the suspension.

34. In a mounting system, the combination of a vibrating body adapted for overhung suspension on an upright support; and a suspension attached to the body for supporting the body in overhung relation to such a support providing angular degrees of freedom of the vibrating body about axes in a substantially upright plane facing such a support for reducing the vibrational effects thereof, comprising a series of swinging elastically cushioned links extending from the body, said links supporting and cushioning the body, and said suspension comprising an elastic means incorporated therein having yieldability under load in the directions of movement corresponding to the said angular movements of the body at the suspension, the elastic cushioning incorporated in the suspension being formed of material such as rubber providing through shear of the elastic material the major portion of the elastic resistance to such angular movement.

35. In a mounting system, the combination of a vibrating body comprising a rotating part adapted for overhung suspension on an upright support; and a suspension attached to the body for supporting the body in overhung relation to such support providing angular degrees of freedom of the vibrating body about axes in a substantially upright plane to such a support and torsional freedom in response to the rotative impulses for reducing the vibrational effects thereof comprising a series of swinging elastically cushioned links extending from the body and around the axis of the rotating part, said links supporting the body, and said suspension having an elastic yieldability under load in the directions of movement corresponding to the said angular and torsional movements of the body at the suspension, the elastic cushioning incorporated in the suspension being formed of elastic material such as rubber providing through shear of the elastic material the major portion of the elastic resistance to said angular and torsional movements.

36. In a mounting system, the combination of a vibrating body comprising a rotating part adapted for overhung suspension on an upright support; and an elastic suspension attached to the body for supporting the body in overhung relation to such support providing torsional freedom in response to the rotative impulses for reducing the vibrational effects thereof comprising a series of supporting swinging links extending from the body and distributed around the axis of the rotating part, and said suspension comprising an elastic means incorporated therein having yieldability under load in the directions of movement corresponding to the movements of the body at the suspension under the torsional impulses, the elastic cushioning incorporated in the suspension comprising an elastic material such as rubber providing the major portion of the resistance to torsional freedom through shear of the rubber.

37. In a mounting system, the combination of a vibrating body comprising a rotating part adapted for overhung suspension on an upright support; and an elastic suspension attached to the body for supporting the body in overhung relation to such support providing torsional freedom in response to the rotative impulses for reducing the vibrational effects thereof comprising a series of supporting swinging links extending from the body and distributed around the axis of the rotating part, and said suspension comprising an elastic means incorporated therein having yieldability under load in the directions of movement corresponding to the movements of the body at the suspension under the torsional impulses with natural frequency in said direction less than $\frac{1}{\sqrt{2}} \times$ the primary frequency of the vibrating body.

38. In a mounting system for an overhung vibrating body, circularly disposed elastic individual units, each unit being characterized by high resistance to deflection in a direction radial with respect to the mounting circle, and link means reducing the resistance of said unit in said radial direction.

WILBUR E. STITZ.

CERTIFICATE OF CORRECTION.

Reissue No. 21,328. January 16, 1940.

WILBUR E. STITZ.

It is hereby certified that error appears in the printed specification of the above numbered patent requiring correction as follows: Page 1, first column, line 11, for "curtained" read --curtailed--; page 2, first column, line 1, for "Vibrations" read --Variations--; and second column, line 56, in the equation, for "$W^{O}$" read --$W_n$--; page 7, first column, line 72, claim 14, for "interlocking" read --interconnecting--; and that the said Letters Patent should be read with this correction therein that the same may conform to the record of the case in the Patent Office.

Signed and sealed this 17th day of September, A. D. 1940.

(Seal)

Henry Van Arsdale,
Acting Commissioner of Patents.